United States Patent
Gao et al.

(10) Patent No.: US 9,939,676 B2
(45) Date of Patent: Apr. 10, 2018

(54) DISPLAY SUBSTRATE AND MANUFACTURING METHOD THEREOF, DISPLAY APPARATUS

(71) Applicant: BOE Technology Group Co., Ltd., Beijing (CN)

(72) Inventors: Jian Gao, Beijing (CN); Yanbing Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 78 days.

(21) Appl. No.: 14/908,634

(22) PCT Filed: Aug. 21, 2015

(86) PCT No.: PCT/CN2015/087766
§ 371 (c)(1),
(2) Date: Jan. 29, 2016

(87) PCT Pub. No.: WO2016/110103
PCT Pub. Date: Jul. 14, 2016

(65) Prior Publication Data
US 2016/0342022 A1    Nov. 24, 2016

(30) Foreign Application Priority Data
Jan. 5, 2015 (CN) .......................... 2015 1 0004060

(51) Int. Cl.
*G02F 1/1335* (2006.01)
*G02B 5/00* (2006.01)
(Continued)

(52) U.S. Cl.
CPC ......... *G02F 1/133528* (2013.01); *G02B 5/00* (2013.01); *G02B 5/3033* (2013.01);
(Continued)

(58) Field of Classification Search
CPC ......... G02F 1/133509; G02F 1/133512; G02F 1/133514; G02F 1/133516;
(Continued)

(56) References Cited

U.S. PATENT DOCUMENTS

| 6,122,103 | A  | 9/2000 | Perkins et al. |
| 2011/0052802 | A1 | 3/2011 | Kaida et al. |
| 2014/0016059 | A1 | 1/2014 | Lee et al. |

FOREIGN PATENT DOCUMENTS

| CN | 1866062 A | 11/2006 |
| CN | 1952700 A | 4/2007 |

(Continued)

OTHER PUBLICATIONS

Nov. 30, 2016—(CN) First Office Action Appn 201510004060.5 with English Tran.

(Continued)

*Primary Examiner* — Stephone B Allen
*Assistant Examiner* — Adam W Booher
(74) *Attorney, Agent, or Firm* — Banner & Witcoff, Ltd.

(57) ABSTRACT

Disclosed are a display substrate and a manufacturing method thereof, as well as a display device. The display substrate includes a base substrate, a wire grating polaroid and a light shield layer. The light shield layer is disposed on the base substrate and partly covers a surface of the base substrate. The wire grating polaroid is disposed on the light shield layer at a position corresponding to the light shield layer. The display substrate addresses the problem of reflecting external light by the wire grating polaroid, enhances definition of images viewed by a user and improves user's use experience.

19 Claims, 2 Drawing Sheets

(51) Int. Cl.
*G02B 5/30* (2006.01)
*G09G 3/34* (2006.01)
*G09G 3/36* (2006.01)

(52) U.S. Cl.
CPC ..... *G02B 5/3058* (2013.01); *G02F 1/133512* (2013.01); *G02F 1/133514* (2013.01); *G09G 3/3413* (2013.01); *G09G 3/3648* (2013.01); *G02F 2001/133548* (2013.01); *G09G 2300/04* (2013.01)

(58) Field of Classification Search
CPC ......... G02F 1/133528; G02F 1/133533; G02F 1/136209; G02F 2001/133519; G02F 2001/133531; G02F 2001/133548; G02F 2001/133562; G02B 5/00; G02B 5/3025; G02B 5/3033; G02B 5/3041; G02B 5/305; G02B 5/3058; G09G 3/3413; G09G 3/3648; G09G 2300/04
See application file for complete search history.

(56) References Cited

FOREIGN PATENT DOCUMENTS

| | | | |
|---|---|---|---|
| CN | 101183158 A | | 5/2008 |
| CN | 101271170 A | | 9/2008 |
| CN | 101437980 A | | 5/2009 |
| CN | 202362481 U | | 8/2012 |
| CN | 202433544 U | | 9/2012 |
| CN | 103052900 A | | 4/2013 |
| CN | 103244875 A | | 8/2013 |
| CN | 103454807 A | * 12/2013 | ............ G02B 27/26 |
| CN | 104216166 A | | 12/2014 |
| WO | 2011065054 A1 | | 6/2011 |

OTHER PUBLICATIONS

Dec. 4, 2015—(WO)—International Search Report and Written Opinion Appn PCT/CN2015/087766 with English Tran.
Jul. 7, 2017—(CN) Second Office Action Appn 201510004060.5 with English Tran.

\* cited by examiner

DISPLAY SUBSTRATE AND MANUFACTURING METHOD THEREOF, DISPLAY APPARATUS

The application is a U.S. National Phase Entry of International Application No. PCT/CN2015/087766 filed on Aug. 21, 2015, designating the United States of America and claiming priority to Chinese Patent Application No. 201510004060.5 filed on Jan. 5, 2015. The present application claims priority to and the benefit of the above-identified applications and the above-identified applications are incorporated by reference herein in their entirety.

TECHNICAL FIELD

Embodiments of the present invention relate to a display substrate and a manufacturing method thereof, and a display apparatus.

BACKGROUND

As a flat panel display apparatus, TFT-LCDs (Thin Film Transistor Liquid Crystal Display) have been applied in the field of high performance display more and more due to their features such as small volume, low power consumption, no irradiation and relatively low manufacturing costs.

A TFT-LCD is comprised of an array substrate and a color filter substrate with a liquid crystal layer disposed therebetween. In addition, a first polaroid is disposed on the top surface of the color filter substrate and a second polaroid is disposed between the array substrate and the backlight unit. The above-mentioned polaroids (first polaroid and second polaroid) are made of polyvinyl alcohol (PVA) film and can only transmit one polarized component of the natural light while absorb the other polarized component. In this way, large amount of light will be lost, which will lower the light utilization ratio greatly.

A TFT-LCD may also have a wire grating polaroid made of metal material. When light irradiates the wire grating polaroid, under the action of oscillation of free electrons on the metal surface, light vibrating parallel to the electric vector component of the wire grating is almost all reflected, while light perpendicular to the electric vector component of the wire grating is almost all transmitted.

However, since the above-mentioned wire grating polaroid is made of metal material, reflectivity for light on the metal material surface is very high. When external light is strong, light can transmit a screen of a display device and hit the wire grating polaroid. While the wire grating polaroid would reflect light back, even into human eyes, which would interfere with a user in viewing images on the display screen and impact viewing effect for the user.

SUMMARY

An embodiment of the present invention provides a display substrate including: a base substrate, a wire grating polaroid and a light shield layer, wherein:
the light shield layer is disposed on the base substrate and partly covers a surface of the base substrate; and
the wire grating polaroid is disposed on the light shield layer at a position corresponding to the light shield layer.
Optionally, the display substrate further includes a color filter layer, wherein:
the color filter layer is disposed at a position on the wire grating polaroid and immediately adjacent to the wire grating polaroid.

Optionally, a material for the light shield layer is a material having light shielding function.
Optionally, the material for the light shield layer is a black resin material, a black metal material or a light sensitive organic material added with a black material.
Optionally, the light shield layer has a thickness of 0.3 µm~10 µm.
Optionally, the wire grating polaroid has a thickness of 40 nm~400 nm.
Optionally, the pitch of the wire grating polaroid is less than or equal to 50~500 nm.
Optionally, the light shield layer is disposed immediately adjacent to the base substrate.

An embodiment of the present invention further provides a manufacturing method of a display substrate, including:
providing a base substrate;
forming a light shield layer partly covering the base substrate on the base substrate; and
forming a wire grating polaroid on the light shield layer at a position corresponding to the light shield layer.

Optionally, the light shield layer is immediately adjacent to the base substrate and partly covers a surface of the base substrate;
optionally, forming a color filter layer covering the light shield layer on the light shield layer.

Optionally, forming the light shield layer and the wire grating polaroid comprises:
forming a film of material having light shielding function on the base substrate;
forming a wire grating polaroid on the film; and
forming the film into the light shield layer at a position corresponding to the wire grating polaroid.

Optionally, a film of material having light shielding function is formed on the base substrate;
a film of metal material is formed on the film of the material having light shielding function.

The film of material having light shielding function and the film of metal material are processed with one patterning process to form the light shield layer and the wire grating polaroid.

Optionally, a material for the light shield layer is selected from the group consisting of a black resin material, a black metal material or a light sensitive organic material added with a black material.

Optionally, the light shield layer has a thickness of 0.3 µm~10 µm.

An embodiment of the present invention further provides a display apparatus including the above-mentioned display substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

1—base substrate; 2—light shield layer; 3—wire grating polaroid; 4—color filter layer.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. All other embodiments obtained by one skilled in the art without any creative labor based on the described embodiments of the present invention fall within the scope of the present invention.

Figure 1:
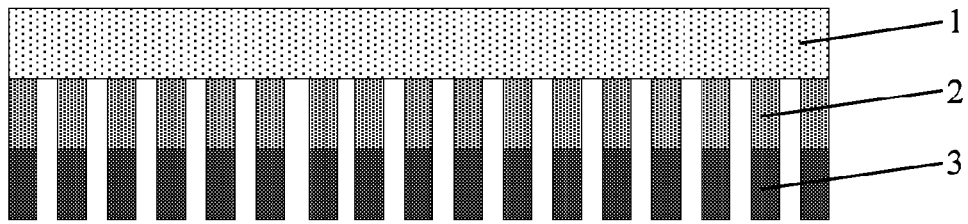
FIG. 1 is a structure diagram of a display substrate provided in an embodiment of the present invention.

Embodiments of the present invention provide a display substrate as shown in FIG. 1, including a base substrate 1, a light shield layer 2 and a wire grating polaroid 3. The light shield layer 2 is disposed on the base substrate 1, for example, immediately adjacent to the base substrate 1 and partly covering a surface of the base substrate 1. A buffer layer may be further formed between the light shield layer 2 and the base substrate 1, which is for example transparent.

The wire grating polaroid 3 is disposed on the light shield layer 2 at a position corresponding to the light shield layer 2. For example, the wire grating polaroid 3 and the light shield layer 2 have the same pattern (as shown in FIG. 1). Alternatively, the wire grating polaroid 3 is only disposed in each sub-pixel area while the light shield layer 2 may be disposed in each sub-pixel area and between sub-pixel areas.

The material for the light shield layer 2 may be of a material having light shielding function.

The material for forming the base substrate 1 may include at least one of glass and quartz. When the wire grating polaroid 3 is applied to a flexible display panel, the material for forming the base substrate 1 may include at least one of polyethylene terephthalate (PET) and Triacetyl Cellulose (TAC) to satisfy design requirements that the flexible display panel can be curved and bent.

It is to be noted that the wire grating polaroid 3 with wire grating patterns needs to be able to polarize incident light. In such cases, the pitch (center distance between two adjacent bumps in the wire grating polaroid) of the above-mentioned wire grating patterns needs to be less than or equal to half of the wavelength of incident light.

With the display substrate provided in embodiments of the present invention, by disposing the wire grating polaroid 3 at a position on the base substrate 1 and immediately adjacent to the base substrate, and disposing a light shield layer formed of material having light shielding function between the base substrate and the wire grating polaroid, when external light transmits the display screen of the display device and irradiates inside of the display device, since the material for the light shield layer is a material having light shielding function, light would be blocked by the light shield layer and cannot reach the wire grating polaroid, which addresses the problem of reflecting external light by the wire grating polaroid, ensuring the definition of pictures viewed by the user, and improving the user's use experience.

Figure 2:
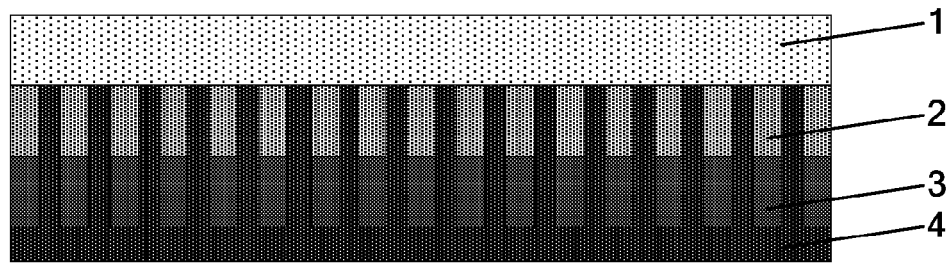
FIG. 2 is a structure diagram of another display substrate provided in an embodiment of the present invention.

Furthermore, in one embodiment of the present invention, referring to FIG. 2, the display substrate may further include a color filter layer 4. For example, the color filter layer 4 is disposed on and immediately adjacent to the wire grating polaroid 3.

For example, the color filter layer 4 in the present embodiment completely covers the wire grating polaroid 3. In the present embodiment, the black matrix may not be additionally made and the light shield layer 2 may provide the same function as the black matrix. Of course, in embodiments of the present invention, it is also possible to prepare the black matrix separately which may or may not be disposed in the same layer as the light shield layer 2.

For example, the material for light shield layer 2 is selected from the group consisting of a black resin material, a black metal material or a light sensitive organic material added with a black material.

For example, the material for light shield layer 2 in the present embodiment may be the same as the material for preparing black matrix. Thus, while manufacturing the light shield layer, no additional new material is needed, which reduces the production difficulty and reduces the production steps.

The light shield layer 2 may have a thickness of for example 0.3~10 μm.

For example, the light shield layer 2 may have a thickness of 1 μm. An appropriate thickness is set for the light shield layer 2 in order to, on the one hand, guarantee that the thickness is sufficient to block light incident on the wire grating polaroid from outside, and meanwhile prevent an oversized light shield layer thickness from increasing the thickness of the display device, influencing the realization of thin and light display device and the overall esthetic appearance.

The thickness of the wire grating polaroid 3 may be for example 40~400 nm.

For example, the thickness of the wire grating polaroid 3 may be set to 200 nm. If the wire grating polaroid has a too small thickness, the segment difference between the bumps on the wire grating polaroid and the film layer it contacts is too small, the wire grating polaroid cannot polarize incident light; and if the wire grating polaroid has a too large thickness, the realization of thinning and lightweight for the display device will be impacted.

The pitch of the wire grating polaroid 3 may be for example less than or equal to 50~500 nm.

While ensuring that the wire grating polaroid can be used normally, the smaller the pitch of the wire grating polaroid, the better. However, the smaller the pitch is, the higher the manufacturing precision is, and the more difficult the processing is. With comprehensive consideration of the process difficulty and the polarization effect, the pitch of wire grating polaroid may be for example 200 nm.

For example, the material for the wire grating polaroid may be metallic aluminum or aluminum alloy. Of course, the material for the wire grating polaroid is not limited to aluminum or aluminum alloy. Any metal material that can ensure that the formed wire grating polaroid can polarize light effectively and does not influence the performance of other layers may be applicable.

Figure 3:
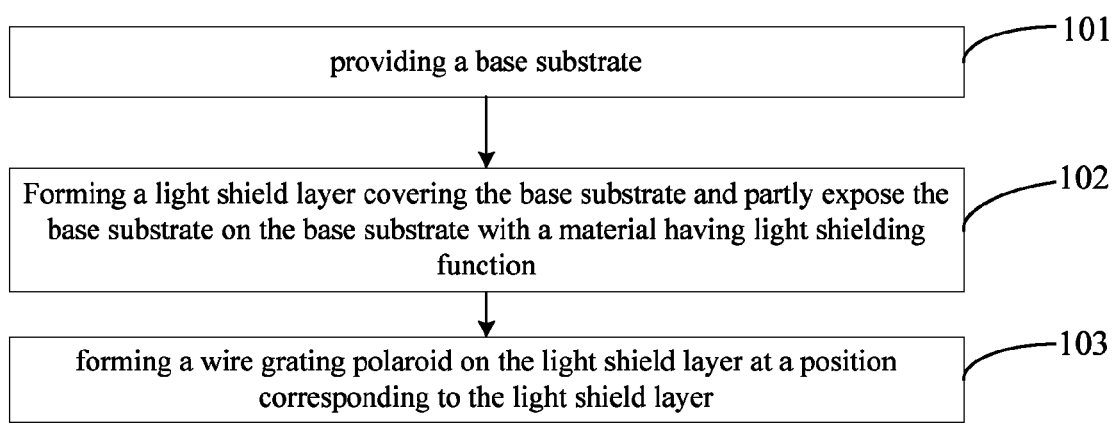
FIG. 3 is a flowchart of a manufacturing method of a display substrate provided in an embodiment of the present invention.

With the display substrate provided in embodiments of the present invention, by disposing the wire grating polaroid on and adjacent to the base substrate, and disposing a light shield layer formed of a material having light shielding function between the base substrate and the wire grating polaroid, in this way, when external light transmits the display screen of the display device and irradiates inside the display device, since the material of the light shield layer is a material having light shielding function, light may be blocked by the light shield layer and cannot reach the wire grating polaroid, which addresses the problem of reflecting external light by the wire grating polaroid, ensures the definition of images viewed by the user and improves the user's use experience. An embodiment of the present invention provides a manufacturing method of display substrate, as shown in FIG. 3, including the following steps.

101. Providing a Base Substrate.

For example, glass or quartz may be used to form the base substrate. Of course, while applied to flexible display panels, the material for forming base substrate may include at least one of PET and TAC.

102. Forming a light shield layer partly covering the base substrate on the base substrate with a material having light shielding function.

For example, the material for light shield layer may be the same material as the black matrix. The material for light shield layer may be a black resin material, black metal material or light sensitive organic material added with sa black material.

103. Forming a wire grating polaroid on the light shield layer at positions corresponding to the light shield layer.

For example, the material for wire grating polaroid may be for example metallic aluminum.

With the display substrate manufacturing method provided in embodiments of the present invention, by disposing the wire grating polaroid at a position on the base substrate and immediately adjacent to the base substrate, and disposing a light shield layer formed of material for blocking light between the base substrate and the wire grating polaroid, when external light transmits the display screen of the display device and irradiates inside of the display device, since the light shield layer is of a material having light shielding function, light would be blocked by the light shield layer and cannot reach the wire grating polaroid, which addresses the problem of reflecting external light by the wire grating polaroid, ensuring the definition of pictures viewed by the user, and improving the user's use experience.

Figure 4:
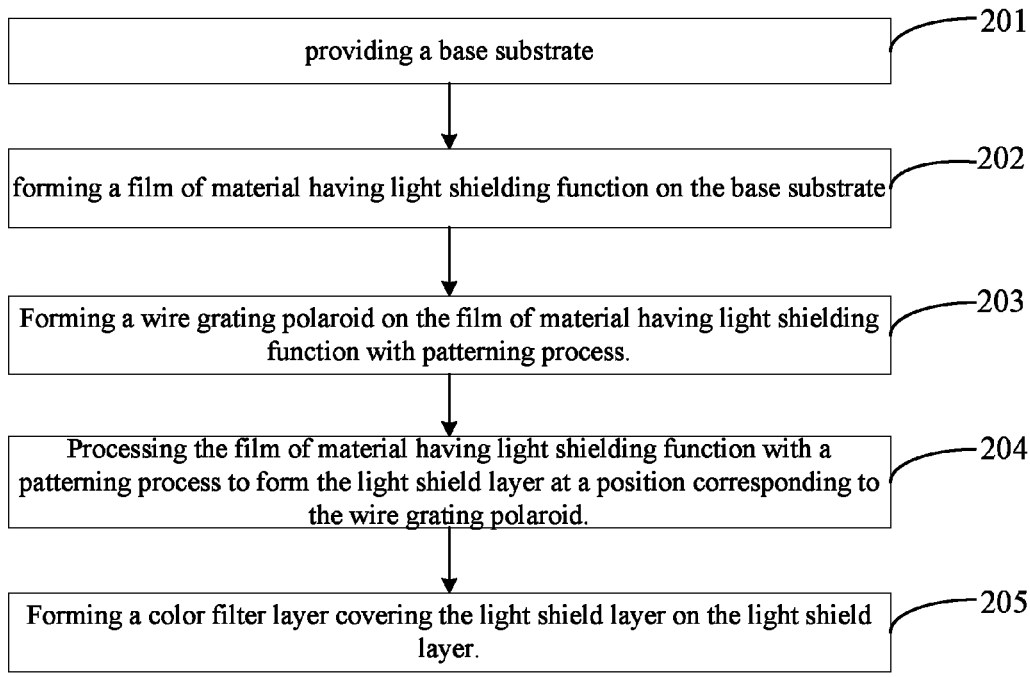
FIG. 4 is a flowchart of a manufacturing method of another display substrate provided in an embodiment of the present invention.

An embodiment of the present invention provides a manufacturing method of display substrate, as shown in FIG. 4, including the following steps.

201. Providing a base substrate.

202. Forming a film of material having light shielding function on the base substrate.

For example, a magnetron sputtering method may used to deposit a film of material having light shielding function with a thickness of 0.3 μm~10 μm on the base substrate. The film of material having light shielding function may be of a black resin material, a black metal material or a light sensitive organic material added with a black material.

203. Forming a wire grating polaroid on the film of material having light shielding function with patterning process.

For example, a metal film with a thickness of 40 nm~400 nm, e.g., 200 nm, may be deposited on the film of material having light shielding function with coating by vaporization method. The metal film may be typically of aluminum. Then the wire grating polaroid formed on certain regions of the film of material having light shielding function is processed with patterning process such as exposure, development, etching and stripping.

204. Processing the film of material having light shielding function with patterning process to form the light shield layer at a position corresponding to the wire grating polaroid.

For example, the film of material having light shielding function may be processed with dry etching process to etch off parts of the film outside regions corresponding to the wire grating polaroid and form a light shield layer corresponding to a position of the wire grating polaroid.

205. Forming a color filter layer covering the light shield layer on the light shield layer.

For example, the color filter layer may be formed on the light shield layer with a prior art manufacturing process for forming color filter layer, which will not be limited here.

It is to be noted, the flow in the present embodiment that is same as the steps in the above-mentioned embodiment may refer to the description for the above-mentioned embodiment, which will not be described any more here.

With the display substrate manufacturing method provided in embodiments of the present invention, by disposing the wire grating polaroid at a position on the base substrate and immediately adjacent to the base substrate, and disposing a light shield layer formed of material for blocking light between the base substrate and the wire grating polaroid, when external light transmits the display screen of the display device and irradiates inside of the display device, since the light shield layer is of a material having light shielding function, light would be blocked by the light shield layer and cannot reach the wire grating polaroid, which addresses the problem of reflecting external light by the wire grating polaroid, ensuring the definition of pictures viewed by the user, and improving the user's use experience.

Figure 5:
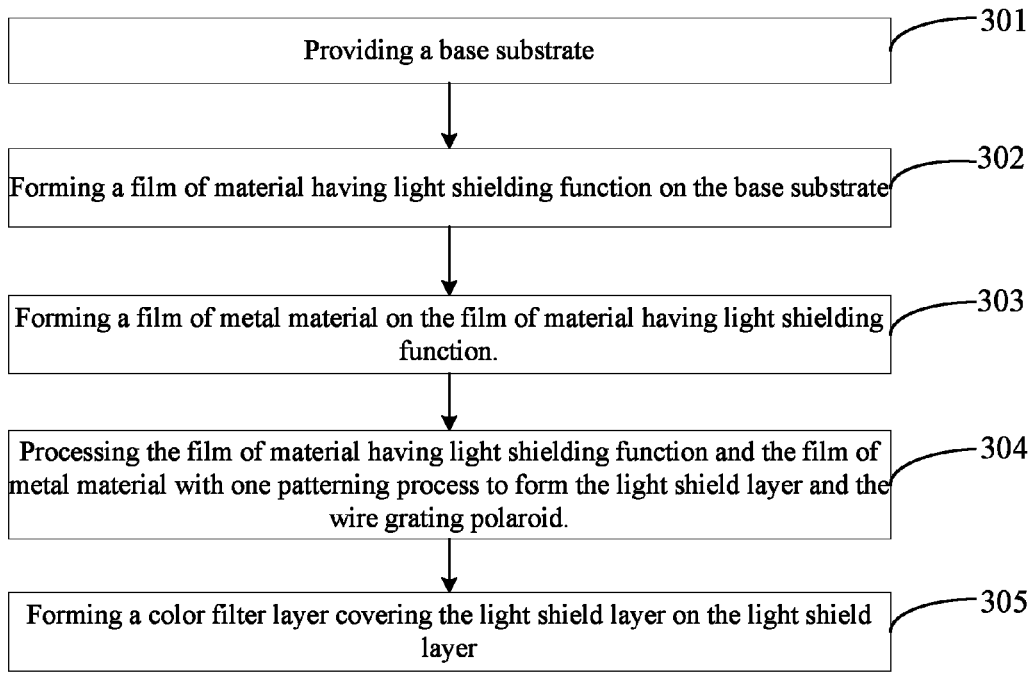
FIG. 5 is a flowchart of a manufacturing method of yet another display substrate provided in an embodiment of the present invention.

An embodiment of the present invention provides a manufacturing method of display substrate, as shown in FIG. 5, including the following steps.

301. Providing a base substrate.

302. Forming a film of material having light shielding function on the base substrate.

303. Forming a film of metal material on the film of material having light shielding function.

For example, a metal film with a thickness of 40 nm~400 nm, e.g., 200 nm, may be deposited on the film of material having light shielding function with vaporization or magnetron sputtering method. The metal film may be of aluminum.

304. Processing the film of material having light shielding function and the film of metal material with one patterning process to form the light shield layer and the wire grating polaroid.

For example, the formed film of material having light shielding function and the film of metal material may be processed with patterning process such as exposure, development and etching to form the pattern of light shield layer and the pattern of wire grating polaroid on a certain region of the base substrate.

305. Forming a color filter layer covering the light shield layer on the light shield layer.

It is to be noted that, the flow in the present embodiment that is same as the steps in the above-mentioned embodiment may refer to the description for the above-mentioned embodiment, which will not be described any more here.

With the display substrate manufacturing method provided in embodiments of the present invention, by disposing the wire grating polaroid at a position on the base substrate and immediately adjacent to the base substrate, and disposing a light shield layer formed of material for blocking light between the base substrate and the wire grating polaroid, when external light transmits the display screen of the display device and irradiates inside of the display device, since the light shield layer is of a material having light shielding function, light would be blocked by the light shield layer and cannot reach the wire grating polaroid, which addresses the problem of reflecting external light by the wire grating polaroid in a display device, ensuring the definition of pictures viewed by the user, and improving the user's use experience.

An embodiment of the present invention provides a display apparatus including any display substrate provided in embodiments corresponding to FIGS. 1-2. For example, the display panel may be any display panel having products or components with display function such as a cell phone, a tablet, a TV set, a notebook computer, a digital picture frame, and a navigator.

With the display panel provided in embodiments of the present invention, by disposing the wire grating polaroid at a position on the base substrate and immediately adjacent to the base substrate in the display panel, and disposing a light shield layer formed of material having light shielding function between the base substrate and the wire grating polaroid, when external light transmits the display screen of the display device and irradiates inside of the display device, since the light shield layer is of a material having light shielding function, light would be blocked by the light shield layer and cannot reach the wire grating polaroid, which addresses the problem of reflecting external light by the wire grating polaroid, ensuring the definition of pictures viewed by the user, and improving the user's use experience.

What are described above is related to the illustrative embodiments of the disclosure only and not limitative to the scope of the disclosure; the scopes of the disclosure are defined by the accompanying claims.

The present application claims priority of China Patent application No. 201510004060.5 filed on Jan. 5, 2015, the content of which is incorporated by reference in its entirety as part of the present application herein.

What is claimed is:

1. A display substrate, comprising: a base substrate, a wire grating polaroid, a light shield layer and a color filter layer, wherein:
   the light shield layer is disposed on the base substrate and partly covers a surface of the base substrate;
   the wire grating polaroid is disposed on the light shield layer at a position corresponding to the light shield layer; and
   the color filter layer is disposed at a position on the wire grating polaroid and immediately adjacent to the wire grating polaroid, and the color filter layer fills up a space in the light shield layer and the wire grating polaroid.

2. The display substrate of claim 1, wherein
   a material for the light shield layer is a material having light shielding function.

3. The display substrate of claim 1, wherein
   a material for the light shield layer is selected from the group consisting of a black resin material, a black metal material, or a light sensitive organic material added with a black material.

4. The display substrate of claim 1, wherein
   the light shield layer has a thickness of 0.3 µm~10 µm.

5. The display substrate of claim 1, wherein
   the wire grating polaroid has a thickness of 40 nm~400 nm.

6. The display substrate of claim 1, wherein
   the wire grating polaroid has a pitch equal to 50~500 nm.

7. The display substrate of claim 1, wherein the light shield layer is disposed immediately adjacent to the base substrate.

8. A display apparatus, comprising the display substrate of claim 1.

9. The display apparatus of claim 8, wherein
   a material for the light shield layer is a material having light shielding function.

10. The display apparatus of claim 8, wherein
    a material for the light shield layer is selected from the group consisting of a black resin material, a black metal material, or a light sensitive organic material added with a black material.

11. The display apparatus of claim 8, wherein
    the light shield layer has a thickness of 0.3 µm~10 µm.

12. The display apparatus of claim 8, wherein the light shield layer is disposed immediately adjacent to the base substrate.

13. A manufacturing method of a display substrate comprising a base substrate, a wire grating polaroid, a light shield layer and a color filter layer, wherein the light shield layer is disposed on the base substrate and partly covers a surface of the base substrate; wherein the wire grating polaroid is disposed on the light shield layer at a position corresponding to the light shield layer; and wherein the color filter layer is disposed at a position on the wire grating polaroid and immediately adjacent to the wire grating polaroid, and the color filter layer fills up a space in the light shield layer and the wire grating polaroid, the method comprising:
    providing the base substrate;
    forming the light shield layer partly covering the base substrate on the base substrate; and
    forming the wire grating polaroid on the light shield layer at the position corresponding to the light shield layer.

14. The method of claim 13, wherein the light shield layer is immediately adjacent to the base substrate and partly covers a surface of the base substrate.

15. The method of claim 13, further comprising:
    forming the color filter layer covering the wire grating polaroid on the light shield layer.

16. The method of claim 13, wherein forming the light shield layer and the wire grating polaroid comprises:
    forming a film of material having light shielding function on the base substrate;
    forming the wire grating polaroid on the film; and
    forming the film into the light shield layer at a position corresponding to the wire grating polaroid.

17. The method of claim 13, comprising:
    forming a film of material having light shielding function on the base substrate;
    forming a film of metal material on the film of the material having light shielding function; and
    processing the film of material having light shielding function and the film of metal material with one patterning process to form the light shield layer and the wire grating polaroid.

18. The method of claim 13, wherein
    a material for the light shield layer is selected from the group consisting of a black resin material, a black metal material, or a light sensitive organic material added with a black material.

19. The method of claim 13, wherein
    the light shield layer has a thickness of 0.3 µm~10 µm.

* * * * *